Sept. 1, 1953 V. L. WALLER 2,650,559
ENGINE PERFORMANCE INDICATOR
Filed Jan. 12, 1949 2 Sheets-Sheet 1

INVENTOR
Vern L. Waller
BY
James E. Sproll
ATTORNEY.

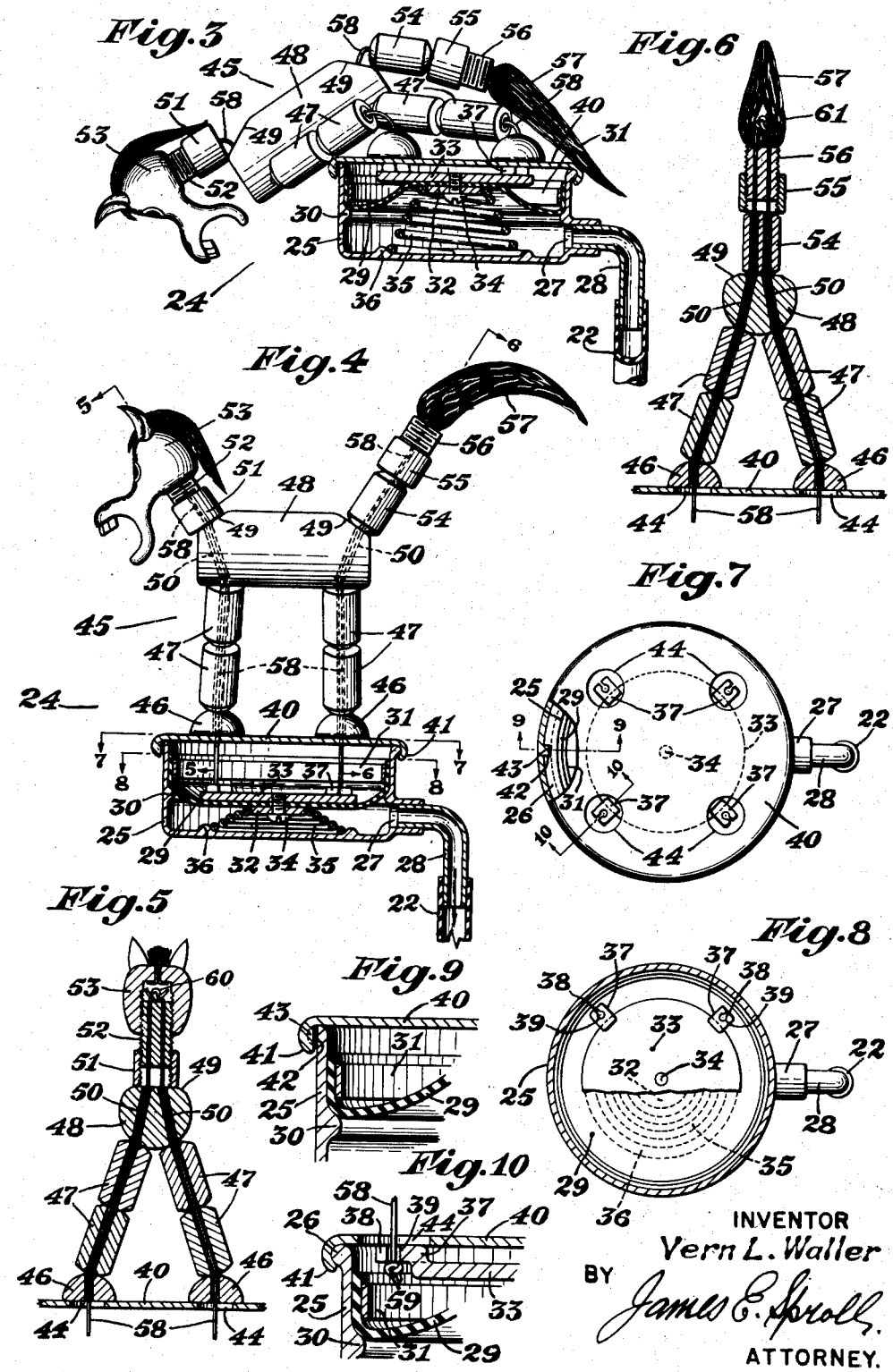

Patented Sept. 1, 1953

2,650,559

UNITED STATES PATENT OFFICE 2,650,559

ENGINE PERFORMANCE INDICATOR

Vern L. Waller, Tacoma, Wash.

Application January 12, 1949, Serial No. 70,427

10 Claims. (Cl. 116—114)

This invention relates to improvements in engine performance indicators for internal combustion engines of the spark ignition type and relates more particularly to novel and useful improvements in the engine performance indicator disclosed and claimed in my pending application for United States Letters Patent, Serial No. 749,840; filed May 22, 1947.

Heretofore, in the many installations of the engine performance indicator of my prior application, too much time was consumed in adapting and accommodating the same to all makes and sizes of internal combustion engines, of both automotive and stationary types, due principally to the fact that the various makes and sizes of such engines create or develop different amounts or degrees of vacuum in their intake manifolds at engine idling speeds, which latter are the installation and testing speeds of the indicators, hence, it is the primary aim and principal object of this invention to provide an engine performance indicator which is universal in its adaptation and application to all makes and sizes of internal combustion engines regardless of the amounts or degrees of vacuum created or developed in their intake manifolds and which will consume the minimum time in the installation of the same.

In general, it has been found hitherto, that the engine performance indicator of the prior application had only a limited range of adjustability for effecting and regulating indicator sensitivity at engine idling speed, therefore, it is another important aim and object of the present invention to provide an adjustable engine porformance indicator having a relatively wide range of adjustability for effecting and regulating indicator sensitivity at engine idling speed, in conformity with the degree of vacuum created or developed in the intake manifold of its associated internal combustion engine.

A further important aim and object of the invention is the provision of an adjustable engine performance indicator which when installed upon and properly adjusted to its associated automotive vehicle engine will reflect the ideal operation of the latter from the standpoint of economy and operating efficiency of the same and will serve and function to warn the vehicle operator of any departure from such ideal operation, so that the necessary adjustments or repairs may be made to said engine to effect a return to the ideal operation of the same.

A still further object of the invention is to provide a vacuum operated engine performance indicator embodying novel and improved vacuum responsive means for activating the indicating device or registering mechanism of the same.

A still further object is to provide an engine performance indicator wherein the indicating device thereof is rapidly and readily attached to and detached from the indicator activating means.

A still further object is to provide an engine performance indicator which may be rapidly and readily mounted upon and removed from the vacuum line of its associated engine for repairs or replacement.

A still further object is to provide an engine performance indicator adaptable for use on automotive vehicles employing either vacuum or electrically operated windshield wipers, vacuum booster pumps for the engines of same, or auxiliary vacuum equipment.

A still further object is to provide an engine performance indicator, the component parts of which may be rapidly and readily assembled and similarly disassembled.

The above, and additional objects which will hereinafter be more specifically treated are attained by such means as are shown in the accompanying drawings, described in the following specification and then more clearly pointed out in the claims, which are appended hereto and form a part of this application.

With reference to the drawings, in which there are illustrated diverse applications of one embodiment of the invention, and throughout the several views of which like characters of reference designate similar parts:

Fig. 3 is a view partly in side elevation and partly in medial vertical section of the engine performance indicator, with the indicating device of same shown in a collapsed or deactivated position;

Fig. 4 is a similar view of the engine performance indicator, with the indicating device of same shown in a vacuum activated and tensioned position;

Figs. 5 and 6 are vertical transverse sections of the indicator on the lines 5—5 and 6—6, respectively, of Fig. 4;

Figs. 7 and 8 are horizontal sections of the same on the lines 7—7 and 8—8, respectively, of Fig. 4, and Figs. 9 and 10 are enlarged fragmentary vertical sections on lines 9—9 and 10—10, respectively, of Fig. 7.

Figure 1:
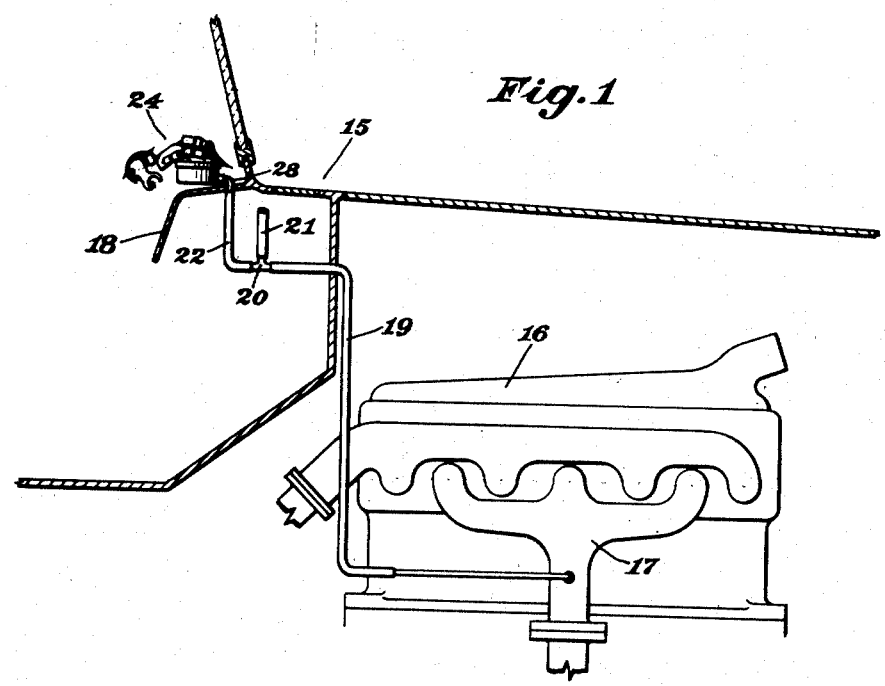
Figure 1 is a fragmentary longitudinal section of an automotive vehicle equipped with the engine performance indicator comprehended by the present invention and shown connected to the vacuum line of the vehicle windshield wiper.

Coming now to a detailed description of the invention and referring more particularly to Fig. 1 of the drawings, wherein the numeral 15 generally designates an automotive vehicle, 16 the vehicle engine, 17 the engine intake manifold, 18 the vehicle instrument board or panel and 19 the vacuum line of the vehicle windshield wiper, not shown, which line 19 is connected to and communicates with the engine intake manifold 17 in a conventional and well known manner.

As now contemplated, the vacuum line 19 at its upper rear end is provided with a T fitting 20, the side outlet of which is connected by a suction line 21 to the windshield wiper, not shown, while the run of said T fitting is connected by a suction line 22, in a manner hereinafter more fully described, to the engine performance indicator of the present invention herein generally designated by the numeral 24.

Figure 2:
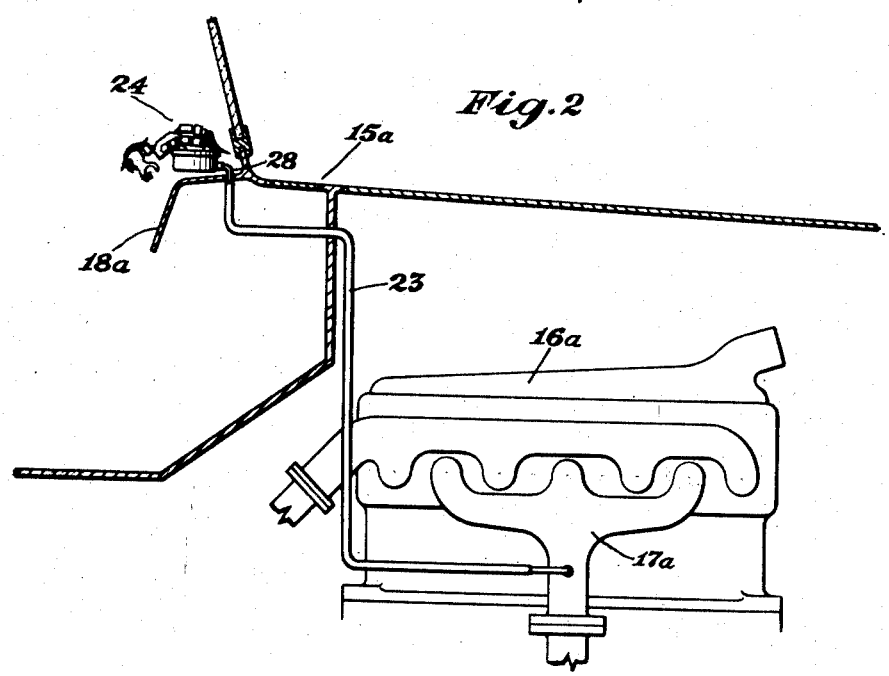
Fig. 2 is a similar section of an automotive vehicle illustrating a slightly modified application of the present engine performance indicator thereto, e. g., the latter being shown directly connected to the vehicle engine intake manifold.

In Fig. 2, wherein a slightly modified arrangement of suction or vacuum line connection for the engine performance indictor 24 is illustrated, the numeral 15a generally designates an automotive vehicle, 16a the vehicle engine, 17a the engine intake manifold, 18a the vehicle instrument board or panel and 23 the suction or vacuum line directly connecting the engine intake manifold 17a to the engine performance indicator 24.

In Figs. 3 to 10, inclusive, the engine performance indicator 24 is shown as being provided with a cylindrical casing or housing 25 having a peripheral bead 26 formed upon the open upper end thereof for a purpose hereinafter described. Formed in the side wall of the casing 25, adjacent the lower end thereof, is an exteriorly bossed suction opening 27 and snugly fitting in sealed relation in such opening is one leg of an elbow fitting 28, the other leg of which is adapted to removably and snugly fit within the upper end of either the suction line 22 or the suction line 23 depending upon whether the engine performance indicator 24 is being employed with and mounted upon an automotive vehicle having a vacuum operated windshield wiper, as in Fig. 1, or an electrically operated windshield wiper, as in Fig. 2, or whether the associated vehicle engine is equipped with a booster pump or any other type of auxiliary vacuum apparatus.

Mounted within the casing 25, intermediate the suction opening 27 and the upper end of same, is a vacuum responsive cup-shaped diaphragm 29 of suitable flexible material, such as rubber, or the like, said diaphragm being preferably slightly oversize so that it is necessary at assembly to press the same into the casing and thereby assure an airtight fit therebetween. To effect proper positioning of the diaphragm 29 within the casing 25, the latter is interiorly provided with an annular bead 30 upon which the lower end of the diaphragm normally seats, see Figs. 3 and 4, and to positively prevent unseating or axial dislodgement of the diaphragm within the casing a slightly oversized diaphragm retaining band 31 of metal, or other suitable material, is provided to compress the side walls of the cup-shaped diaphragm against the interior walls of the casing, whereby an airtight or hermetically sealed relation is established therebetween.

Concentrically disposed upon and normally abutting the lower face of the diaphragm 29 is a centrally apertured lower disk or washer 32, of relatively small diameter, and similarly disposed upon and abutting the upper face of the diaphragm is a centrally apertured upper disk or anchor member 33, of relatively larger diameter, which disks are clamped to the diaphragm 29, in hermetically sealed relation thereon, as by a round head self-tapping screw 34, which is adapted to tap into the central aperture of the upper disk 33 and to be thus threadedly secured therein, substantially in the manner shown more clearly in Figs. 3 and 4. In connection with the foregoing, it should be here stated, that it is entirely optional whether the diaphragm 29 is provided, prior to assembly, with a central perforation or not, to accommodate the self-tapping screw 34, inasmuch as, such diaphragm may be rapidly and readily perforated or pierced at assembly to permit passage of said screw therethrough.

Interposed between the lower face of the diaphragm 29 and the inner face of the bottom wall of the casing 25 is a frustro-conical helical compression spring 35 for normally biasing or flexing said diaphragm 29 to its inactive or retracted position upon cessation of suction or vacuum at its source. The spring 35 is maintained and retained in concentric relation within the casing 25, at its upper smaller end, by the diaphragm abutting disk 32 and, at its lower larger end, by a bead 36 concentrically formed upon the inner face of the bottom wall of the casing 25, see Figs. 3, 4 and 8.

The upper diaphragm abutting disk 33 upon the upper face and marginal portion thereof is provided with a series of uniformly spaced anchor lugs 37, either integral therewith or secured thereto in any suitable manner and extending radially therefrom, said lugs at their outer ends having slots 38 formed therein, which latter at their inner ends terminate in apertures 39 of a diameter slightly greater than the width of said slots, for a purpose shortly to be described.

The upper open end of the casing 25 is adapted to be normally closed by a cover or lid 40 having a downwardly and inwardly directed curvilinear edge 41 adapted to snap over and restrainingly engage the peripheral bead 26 of the casing 25, see Figs. 3, 4 and 10, whereby such cover is positively retained in operative position upon said casing. For a reason which will hereinafter be made more apparent, the bead 26 is provided with a notch 42 to accommodate and be engaged by an interfitting cover positioning lug 43 formed interiorly upon the curvilinear edge 41 of the cover 40, as more clearly shown in Fig. 9. The cover 40 is also provided with a series of uniformly spaced holes or openings 44, which are normally and substantially disposed in vertical axially aligned relation with the apertures 39 of the diaphragm abutting disk 33, hence, it will be manifest and apparent, in order to definitely locate and position the cover holes 44 in vertical alignment with the disk apertures 39 upon initial placement of the cover 40 on the casing 25 or any subsequent replacement of same thereon, it is necessary and essential to provide the notch 42 and its interfitting lug 43, or their equivalent, which notch and lug also function, in addition to cover placement, to lock the cover 40 against circumferential movement upon the casing 25 and in consequence positively prevents vertical displacement of the cover holes 44 relative to the disk apertures 39.

As in the disclosure of my prior application, so in the present, the indicating or registering device of the instant engine performance indicator, generally designated herein by the numeral 45, is shown as an articulated and collapsible figure, specifically the simulation of an animal, such as a horse, with this essential difference however, the present indicating device 45 is adjustable, whereby its sensitivity to vacuum activation is regulated in conformity with the degree of vacuum developed in the associated engine intake manifold at engine idling speed, while the corresponding indicating device of the former engine performance indicator was not so adjustable.

The articulated and collapsible figure 45 normally rests upon and is supported by the cover 40 of the casing 25, and as now fabricated, said figure comprises front and rear legs, each consisting of an axially perforated semi-spherical cover abutting or contacting member 46 and a pair of similarly perforated cylindrical abutting members 47; a cylindrical animal body 48 which normally abuts and rests upon the said front and rear legs and at its ends and upper side is provided with bevelled faces 49 and adjacent the ends thereof is also provided with pairs of perforations 50 formed in downwardly flaring relation therein; an adjustable neck assembly consisting of an interiorly threaded collar or female member 51, normally in abutment with the bevelled face 49 at the forward end of the body 48, and an exteriorly threaded and longitudinally perforated sleeve or male member 52 threadedly engaged within the female member 51 for axial adjustment relative thereto; an animal head 53, which may be threadedly secured upon the outer end of the exteriorly threaded sleeve 52, or frictionally engaged thereon, as found desirable or deemed expedient; and an adjustable tail assembly consisting of a longitudinally perforated cylindrical member 54, normally in abutment with the bevelled face 49 at the rear end of the animal body 48, an interiorly threaded collar or female member 55, normally in abutment with the cylindrical member 54, an exteriorly threaded and longitudinally perforated sleeve or male member 56 threadedly engaged within the sleeve 55 for axial adjustment relative thereto, and a tail-like appendage 57, of hair or other suitable material, for enhancing and completing the appearance of the figure 45. To materially augment the flexibility of the indicating device or figure 45, the abutting ends of the cylindrical members 47 and 54 are preferably and substantially convexed or curved with only a comparatively small area of said abutting ends left flat, as shown more clearly in Figs. 5 and 6.

Flexible tension-transmitting members 58, such as cords or the like, pass freely through the perforations of the legs, body, neck and tail of the figure 45, substantially in the manner more clearly shown in Figs. 5 and 6, and thus serve and function to loosely interconnect same, such members or cords 58 also function to connect the figure 45 with the vacuum responsive and/or figure activating means of the indicator 24, and for this purpose the lower end portions of these members pass downwardly through the holes 44 in the cover 40 for releasable connection with the slotted lugs 37 of the diaphragm or anchor disk 33, at which time and place such lower end portions are restrainingly engaged within the apertures 39 against lateral dislodgement therefrom by the relatively narrow slots 38 and against upward dislodgement or withdrawal from said apertures 39, as by terminal knots 59 formed or tied upon said lower end portions. The upper end portions of the members or cords 58 which pass through the exteriorly threaded sleeve 52 of the adjustable neck assembly are tied together, at the outer end of said sleeve, in a terminal knot 60, see Fig. 5, while, the upper end portions of the members or cords 58 which pass through the exteriorly threaded sleeve 56 of the adjustable tail assembly of the indicating device or figure 45 are, following their passage through said sleeve, first wrapped around the switch of hair forming and constituting the tail-like appendage 57 in order to flexibly connect the same to the sleeve 57, following which the ends of the members 58 are tied to form a terminal knot 61, substantially in the manner shown in Fig. 6.

With the suction or vacuum lines 22 and 23 arranged and/or installed upon their respective automotive vehicles 15 and 15a, as shown in Figs. 1 and 2, the procedure of mounting the present adjustable engine performance indicator 24 upon said automotive vehicles 15 and 15a is identical, hence, a description of one will suffice for both, therefore, taking the initial installation of the adjustable engine performance indicator 24 upon the vehicle 15, as an example, the mounting and the adjustment of such indicator for effective operation with the engine 16 thereof is carried out in the manner now to be described.

The axially adjustable sleeves 52 and 56 are first completely telescoped within their respective collars 51 and 55, thus producing maximum slack in the flexible tension-transmitting members 58. The free or vertical leg of the indicator elbow 28 is then passed through an appropriate opening in the vehicle instrument board 18 and inserted within the upper end portion of the suction line 22, which portion is normally disposed in aligned relation with said opening and in close proximity thereto, and when thus inserted within the upper end portion of the suction line 22, the vertical leg of said elbow 28 is adapted to snugly fit in sealed relation therein, however, such leg may be withdrawn from the suction line 22 at any time to effect replacement of the indicator 24 or any repairs thereto, as found necessary or expedient. Following the above, the sensitivity of the indicator 24 is adjusted and regulated to conform with the degree of vacuum created or developed in the engine intake manifold 17 at engine idling speed, which adjustment is effected by starting the engine 16 and allowing same to warm up at such idling speed, after which the collars 51 and 55 are rotated upon their correlated axially adjustable threaded sleeves 52 and 56, respectively, causing the latter to move outwardly in their collars and thereby conjointly with the vacuum flexing of the diaphragm 29 take up sufficient slack in the tension-transmitting members 58 to raise the indicator device or figure 45 to a substantially and loosely erect position without tautness, so that any slight variation of vacuum in the intake manifold 17 will be instantly registered by said indicator device or figure 45 gyrating slightly. When adjustment for indicator sensitivity has been completed, in the manner just described, no further adjustment of the indicator 24 is necessary unless or until a change occurs in the operating conditions of the engine 16 for any reason, as for example, should the amount or degree of vacuum created or developed in the engine intake manifold 17 be decreased or lowered, the indicator device or figure 45 will warn the vehicle operator that the engine 16 requires attention and after the necessary adjustments and/or repairs have been made thereto, the indicator device or figure 45 is readjusted, in the identical manner described above for its initial adjustment, to thus conform to the new engine operating conditions, as will be readily understood from the foregoing. The indicator adjustment procedure, outlined above, is followed for the engines of both new and used vehicles, inasmuch as in each instance, regardless of whether the engine is new or used, it is essential and necessary to adjust and regulate the indicator to conform to the individual and specific operating conditions of each engine, in order to obtain maximum indicator efficiency in accurately reflecting engine performance.

In the operation of the automotive vehicle 15 the vacuum created or developed in the engine intake manifold 17 causes downward flexing of the diaphragm 29 and compression of the diaphragm biasing spring 35 and concurrently therewith elevation of the indicating device or figure 45 to a substantially upright or activated position, as shown in Fig. 4, and variations in the amount or degree of vacuum in said manifold, due to traffic conditions, or by reason of the vehicle ascending or descending grades, will cause flexing and reflexing of the diaphragm 29, which actions are imparted to the indicating device 45 by the tension-transmitting members 58 and translated into various gyrations and motions of such device and at times cause the same to briefly assume diverse grotesque positions. Upon stopping of the engine 16 for any reason and in consequence cessation of vacuum in the intake manifold 17, the spring 35 biases or flexes the diaphragm 29 to its inactive position, thus relieving the tension on the members 58, thereby causing or effecting collapse of the indicating device or figure 45 to its deactivated position, as shown in Fig. 3. The foregoing operational description assumes an efficiently and smoothly running engine, if however, for any various causes or reasons, the engine 16 is not operating efficiently or running smoothly, such condition or conditions will be immediately reflected or registered by unusual actions or movements of the indicating device or figure 45, thereby warning the vehicle operator that something is amiss and requiring prompt adjustment or repair, such as mechanical defects, excessive fuel consumption, horsepower deficiency, altitude effect on the engine, or the like, all of which are fully set forth in my aforementioned pending application.

Extensive practical use of the present adjustable engine performance indicator 24 upon various types of commercial and passenger automotive vehicles has shown and demonstrated, that conservation and economy of fuel may be better and more fully effected if the indicating device or figure 45 of the indicator 24 is maintained and retained in a substantially erect or upright position during operational periods of such vehicles, more especially on long level stretches of highway, and in order to obtain such a condition and sustain said indicating device 45 in the above described position, it has been found both desirable and expedient, to first increase the speed of the vehicle above normal driving speed, and after a brief period at the higher speed drop back to normal driving speed, as an illustration, assuming a normal vehicle driving speed of fifty miles per hour, the vehicle speed is first stepped up to fifty-five or sixty miles per hour, and later is dropped back to the normal driving speed of fifty miles per hour, at which speed the indicating device or figure 45 will remain substantially erect and upright without drooping or sagging.

In the present adjustable engine performance indicator disclosure, while I have elected to show and describe the tension adjusting means of same as mounted upon the neck and tail assemblies of the indicating animal figure 45, I desire to have it understood, that such showing is merely illustrative, since, said tension adjusting means may be located at other points on said figure, such as, the legs of same, the inner terminals of the tension-transmitting members 58, or any other convenient or suitable location thereon, as deemed desirable or expedient.

Also in the present disclosure I have elected to show and describe a frustro-conical type of helical compression spring for biasing or flexing the diaphragm 29 toward its upper or inactive position, but, it is of course to be here understood, that various other types of springs may be employed for such purpose, the choice of and preference for the frustro-conical type of helical compression spring was made because the latter provides the maximum range of movement in a relatively shallow and confined space and when fully compressed the coils of same telescope one within the other substantially to a common plane, thus assuring of the provision of ample space for the maximum flexing movements of the vacuum responsive diaphragm 29, as will be readily apparent and understood.

As in the indicator disclosure of the prior application, also in the present disclosure, I have elected to show and describe the visual indicating or registering device 45 of the adjustable engine performance indicator of this invention, in the form of an articulated or jointed animal figure, such as the simulation of a horse, but of course, it should be here noted and understood that such elected showing is merely by way of illustration, since, other and different devices or mechanisms employing pluralities or series of elements or members flexibly interconnected by adjustable tension-transmitting means may be substituted for the device shown and described herein.

For reasons of economy and facility of manufacture, durability and lightness of construction, and the many and varied colors which may be obtained without paint or lacquer, the rigid members or parts of the indicator 24, other than the metal band 31, screw 34 and the helical spring 35, are preferably, although not necessarily, made from plastic material, which is expeditiously and readily die-molded and with which the selected pigment or coloring matter is easily added to the plastic powder during the molding process.

Manifestly, therefore, the compact and simplified adjustable engine performance indicator of the present invention is adaptable for rapid and ready installation upon and operation with various makes and sizes of internal combustion engines of the spark ignition type; is rapidly and readily adjusted, following installation, to conform to and compensate for the different degrees of vacuum created in the intake manifolds of said engines at engine idling speeds; and has a relatively wide range of adjustability for effecting and regulating indicator sensitivity at engine idling speeds, whereby the applicability of the indicator to different makes and sizes of engines is materially broadened and enhanced.

While, I have herein shown and described the invention with sufficient detail to enable those skilled in the art to understand the mode of construction and the principles involved, it is to be here understood that there is no intentional limitation herein to the specific form and precise details of construction herein disclosed, except as expressly defined by the appended claims, and that various modifications of said construction may be resorted to without departing from the spirit of the invention, or the benefits derivable therefrom. I also desire to have it understood that certain features of the invention herein disclosed may be employed in and with various other combinations than those shown and described.

Having thus fully described my invention, what I claim as new and desire to secure by Letters Patent is:

1. In combination with the vacuum producing means of an internal combustion engine, of an engine performance indicator comprising a casing having permanent and unobstructed communication with said vacuum producing means; a vacuum responsive flexible diaphragm mounted in sealed relation within said casing; anchor means fixedly secured to said diaphragm; a collapsible performance indicating device including flexible tension-transmitting means releasably connected to said anchor means, whereby flexing and reflexing movements of said diaphragm function to activate said device and thus visually and continually indicate vacuum fluctuations occurring within said vacuum producing means during engine operational periods; tension adjusting means associated with said tension-transmitting means for regulating the sensitivity of the indicating device in conformity with the degree of vacuum developed in said vacuum producing means when said engine is idling; and means for normally biasing said diaphragm towards its inactive position upon cessation of vacuum in said vacuum producing means to effect conjointly with gravity the collapse of said indicating device.

2. In combination with the vacuum producing means of an internal combustion engine, of an engine performance indicator comprising a casing having an open upper end and adjacent the lower end thereof having permanent and non-restricted communication with said vacuum producing means; a detachable perforated cover for the open upper end of said casing; a vacuum responsive flexible diaphragm mounted in sealed relation within said casing; an anchor disk secured to the upper face of said diaphragm; a collapsible performance indicating device including a plurality of relatively movable and abutting members and flexible tension-transmitting means passing loosely through said members and said perforated cover for releasable connection with said anchor disk, whereby flexing and reflexing movements of said diaphragm during engine operational periods function to activate said device for visually and continually indicating vacuum fluctuations occurring within said vacuum producing means; tension adjusting means associated with said tension-transmitting means for regulating the sensitivity of the indicating device in conformity with the degree of vacuum developed in said vacuum producing means when said engine is idling; and resilient means for normally biasing said diaphragm towards an inactive position upon cessation of vacuum in said vacuum producing means to effect conjointly with gravity the collapse of said indicating device.

3. In combination with the vacuum producing means of an internal combustion engine, of an engine performance indicator comprising a casing having an open upper end and having permanent and unobstructed communication at the lower end thereof with said vacuum producing means; a detachable cover for the open upper end of said casing having a series of perforations therein; a vacuum responsive flexible diaphragm mounted in sealed relation within said casing; a disk secured to the upper face of said diaphragm in concentric relation thereon, said disk having a series of apertured anchor lugs formed upon the marginal portion thereof and normally disposed in vertically aligned relation with the perforations in said casing cover; a collapsible performance indicating device including separate pluralities of relatively movable and abutting sections; flexible tension-transmitting members passing loosely through and interconnecting each of said pluralities of sections and having their inner end portions passing loosely through the perforations in said cover for releasable engagement with said apertured anchor lugs, whereby flexing and reflexing movements of said diaphragm function to activate said device for visually and continually indicating vacuum fluctuations occurring within said vacuum producing means during engine operational periods; tension adjusting means associated with said tension-transmitting members for regulating the sensitivity of the performance indicating device in conformity with the degree of vacuum developed in said vacuum producing means when said engine is idling; and spring means for normally biasing said diaphragm towards an inactive position upon cessation of vacuum in said vacuum producing means for returning the performance indicating device to its deactivated position.

4. In combination with the vacuum producing means of an internal combustion engine, of an engine performance indicator comprising a casing having an open upper end and adjacent the lower end thereof having permanent and unobstructed communication with said vacuum producing means; a detachable perforated cover adapted for restraining engagement upon the open upper end of said casing; a vacuum responsive flexible diaphragm mounted in sealed relation within said casing; an anchor disk secured to said diaphragm; a collapsible simulation of an animal adapted to be supported by said perforated cover, said simulation consisting of a series of relatively movable and abutting sections including neck and tail assemblies; flexible tension-transmitting members passing loosely through said sections and assemblies and having their lower end portions passing similarly through said perforated cover for releasable engagement with said anchor disk, whereby flexing and reflexing movements of said diaphragm, during engine operational periods, function to impart life-like movements to said animal simulation for visually and continually indicating vacuum fluctuations occurring within said vacuum producing means; axially adjustable means associated with said neck and tail assemblies for varying the tension on said tension-transmitting members to thereby regulate the sensitivity of said animal simulation in conformity with the degree of vacuum developed in said vacuum producing means when said engine is idling; and means for normally biasing the diaphragm towards an inactive position upon cessation of vacuum in said vacuum producing means for effecting conjointly with gravity the collapse of said animal simulation.

5. In combination with the vacuum producing means of an internal combustion engine, of an engine performance indicator comprising a casing having permanent and unobstructed communication with said vacuum producing means, vacuum responsive means mounted within said casing, performance indicating means including tension-transmitting means operably connected with said vacuum responsive means in a manner effective to activate said performance indicating means for visually and continually indicating any vacuum fluctuation occurring within said vacuum producing means during engine operational periods, and means operably associated with said tension-transmitting means for regulating the sensitivity of said performance indicating means in conformity with the degree of vacuum developed in said vacuum producing means when said engine is idling.

6. In combination with the vacuum producing means of an internal combustion engine, of an engine performance indicator comprising a casing having permanent and unobstructed communication with said vacuum producing means, vacuum responsive means mounted within said casing, collapsible performance indicating means including flexible tension-transmitting means operably connected with said vacuum responsive means in a manner effective to activate said performance indicating means for visually and continually indicating vacuum fluctuations occurring in said vacuum producing means during engine operational periods, and means operably associated with said tension-transmitting means for regulating the sensitivity of said performance indicating means in conformity with the degree of vacuum developed in said vacuum producing means when said engine is idling.

7. In combination with the vacuum producing means of an internal combustion engine, of an engine performance indicator comprising a casing having permanent and unobstructed communication with said vacuum producing means, a vacuum responsive diaphragm operatively mounted within said casing, collapsible performance indicating means including flexible tension-transmitting means operably connected with said diaphragm in a manner effective to activate said performance indicating means for visually and continually indicating vacuum fluctuations occurring in said vacuum producing means during engine operational periods, and means operably associated with said tension-transmitting means for regulating the sensitivity of said performance indicating means in conformity with the degree of vacuum developed within said vacuum producing means when said engine is idling.

8. In combination with the vacuum producing means of an internal combustion engine, of an engine performance indicator comprising a casing having permanent and unobstructed communication with said vacuum producing means, a vacuum responsive diaphragm operatively mounted within said casing, a collapsible performance indicating device including flexible tension-transmitting means operably connected with said diaphragm in a manner effective to activate said performance indicating device for visually and continually indicating vacuum fluctuations occurring within said vacuum producing means during engine operational periods, means for normally biasing said diaphragm towards its inactive position during engine non-operational periods for effecting conjointly with gravity the collapse of said performance indicating device, and means operably associated with said tension-transmitting means for regulating the sensitivity of said performance indicating device in conformity wth the degree of vacuum developed within said vacuum producing means when said engine is idling.

9. In combination with the vacuum producing means of an internal combustion engine, of an engine performance indicator comprising a cylindrical casing having permanent and unobstructed communication adjacent its lower end with said vacuum producing means, a vacuum responsive flexible diaphragm mounted in sealed relation within said casing, anchor means firmly secured to said diaphragm, a collapsible performance indicating device including at least one flexible tension-transmitting member operably and releasably connected with said anchor means in a manner effective to activate said performance indicating device for visually and continually indicating vacuum fluctuations occurring within said vacuum producing means during engine operational periods, means for normally biasing said diaphragm towards its intactive position upon cessation of vacuum in said vacuum producing means for effecting conjointly with gravity the collapse of said performance indicating device, and means operably associated with said tension-transmitting member for regulating the sensitivity of said performance indicating device in conformity with the degree of vacuum developed in said vacuum producing means when said engine is idling.

10. In a collapsible device adaptable for indicating vacuum fluctuations occurring within the vacuum producing means of an internal combustion engine during operational periods of the same, the combination comprising: a series of perforated relatively movable and abutting sections, a flexible tension-transmitting member passing loosely through and interconnecting said sections, and means operably associated with said flexible tension-transmitting member for imposing a predetermined amount of initial tension thereon at engine idling speed, said means including an interiorly threaded collar normally abutting one of the relatively movable sections of said series and an axially perforated exteriorly threaded sleeve threadedly engaged within said collar and through both of which said tension-transmitting member passes freely and at its outer terminal is adapted to be restrainingly engaged by the outer end of said sleeve whereby axial adjustment of the latter within its correlated collar increases or decreases the tension on said tension-transmitting member.

VERN L. WALLER.

References Cited in the file of this patent

UNITED STATES PATENTS

| Number | Name | Date |
|---|---|---|
| 1,043,514 | Drexler | Nov. 5, 1912 |
| 1,392,538 | Tice | Oct. 4, 1921 |
| 1,867,698 | Harris | July 19, 1932 |
| 1,874,694 | Broce | Aug. 30, 1932 |
| 1,904,865 | Knobloch | Apr. 18, 1933 |
| 1,926,180 | Rutherford | Sept. 12, 1933 |
| 2,463,355 | Buchmann | Mar. 1, 1949 |
| 2,607,314 | Waller | Aug. 19, 1952 |

FOREIGN PATENTS

| Number | Country | Date |
|---|---|---|
| 553,211 | Great Britain | May 12, 1943 |
| 182,414 | Germany | Mar. 16, 1907 |